(12) United States Patent
Foreth et al.

(10) Patent No.: US 7,090,286 B1
(45) Date of Patent: Aug. 15, 2006

(54) POWERED CAMPER TOP LIFT SYSTEM

(75) Inventors: Craig E. Foreth, Brighton, CO (US);
William M. Ward, Brighton, CO (US)

(73) Assignee: Hallmark Manufacturing, Inc.,
Brighton, CO (US)

( * ) Notice: Subject to any disclaimer, the term of this patent is extended or adjusted under 35 U.S.C. 154(b) by 0 days.

(21) Appl. No.: 11/027,143

(22) Filed: Dec. 29, 2004

Related U.S. Application Data

(60) Provisional application No. 60/533,938, filed on Dec. 31, 2003.

(51) Int. Cl.
*B60P 3/355* (2006.01)

(52) U.S. Cl. ............... 296/173; 296/26.04; 296/26.06; 296/26.07

(58) Field of Classification Search ............... 296/165, 296/172, 173, 176, 26.04, 26.06, 26.07, 100.05, 296/100.08, 100.1
See application file for complete search history.

(56) References Cited

U.S. PATENT DOCUMENTS

| | | | | |
|---|---|---|---|---|
| 3,575,460 A | * | 4/1971 | Kennedy | ................. 296/26.07 |
| 4,103,958 A | * | 8/1978 | Parent | ......................... 296/165 |
| 4,262,956 A | * | 4/1981 | Kellam | .................... 296/26.07 |
| 4,548,438 A | * | 10/1985 | Myers | ......................... 296/176 |
| 5,505,515 A | * | 4/1996 | Turner | ......................... 296/165 |
| 6,086,134 A | * | 7/2000 | Cravens et al. | ............. 296/165 |
| 6,325,447 B1 | * | 12/2001 | Kuo | ........................... 296/165 |
| 2004/0227369 A1 | * | 11/2004 | Davidson et al. | ........ 296/26.07 |

* cited by examiner

*Primary Examiner*—Jason Morrow
(74) *Attorney, Agent, or Firm*—Brian D. Smith, P.C.

(57) ABSTRACT

A cableless power lift assembly for raising and lowering the roof structure or camper top of a pop-up camper includes an elongated drive housing mounted to the base of a pop-up camper and a pair of aligned left and right threaded screw drives mounted in the drive housing for rotatable movement therein. A motor is attached to the left and right screw drives for rotatably driving the screw drives to raise the camper top upon actuation of said motor in a first direction and lower the camper top upon actuation of the motor in an opposite second direction. In addition, collapsible lifting apparatus is also provided for moving the camper top between a generally horizontal lowered or collapsed position and a generally horizontal raised or extended position. In a preferred embodiment, an air conditioning unit is mounted in the camper top.

15 Claims, 3 Drawing Sheets

POWERED CAMPER TOP LIFT SYSTEM

CROSS REFERENCE TO RELATED APPLICATION

This application is a nonprovisional application claiming the benefit under 35 USC 119(e) of U.S. provisional application Ser. No. 60/533,938, filed on Dec. 31, 2003.

FIELD OF THE INVENTION

The present invention is directed to a cableless power lift assembly for raising and lowering the roof structure of a pop-up camper. However, the aforementioned reference to this use is not to be construed as limiting the invention to such use. On the contrary, the present invention can be utilized in a variety of different environments including campers and/or trailers.

BACKGROUND OF THE INVENTION

A review of the prior art found in a search for subject matter related to the present invention revealed no cableless power lift assemblies or other cableless powered apparatus for raising and lowering the roof structure of a pop-up camper of the type having a collapsible soft or flexible wall. The search included a review of the following patents; U.S. Pat. Nos. 3,884,520; 4,969,793; 5,769,485; 6,086,134 and 6,325,447. In addition, the search revealed no pop-up campers having an air conditioner mounted in the pop-up camper's roof or powered lift systems for a pop-up camper having the capability of raising and lowering the camper's pop-up roof with any type of a significant load mounted or stored on the roof.

OBJECTS AND SUMMARY OF THE INVENTION

An object of the present invention is to provide a power lift assembly for raising and lowering the roof structure of a pop-up camper.

Another object of the present invention is to provide such a power lift assembly with the power and capability of raising and lowering the camper's roof structure with a load mounted on the roof structure such as an air conditioning unit mounted in the roof structure and/or a canoe, kayak or other product mounted on the roof structure.

Yet a further object of the present invention is to provide a lift assembly that can be operated both manually and automatically.

Still another object of the present invention is to provide a power lift assembly having a motor that is non-back driveable so that the camper's roof structure will not collapse in the event of a failure.

Yet another object of the present invention is to provide a power lift assembly that will automatically shut off when the roof structure it is raising or lowering reaches the desired raised or lowered position.

Yet still another object of the present invention is to provide a power lift assembly with safety features that will stop raising and/or lowering the roof structure in the event the assembly's automatic shut off feature fails.

Yet still a further object of the present invention is to provide a power lift assembly which can be inexpensively and easily installed.

These and other objects of the present invention will be readily apparent upon a review of the following detailed description of the preferred form of the invention and the accompanying drawings. These objects are not exhaustive and are not to be construed as limiting the scope of the claimed invention.

In summary, the present invention is directed to a power lift assembly, preferably a cableless power lift assembly, for raising and lowering the roof structure of a pop-up camper. In general, the assembly includes a pair of aligned left and right threaded rotatable screw drives and a motor attached to the screw drives for rotatably driving the screw drives. Collapsible lifting apparatus driven by the motor actuated left and right screw drives are also provided for raising the roof structure of a pop-up camper from a generally horizontal lowered, collapsed position to a generally horizontal raised, extended position upon actuation of the motor in a first direction and lowering the roof structure from the raised position to the lowered position upon actuation of the motor in an opposite second direction.

In a preferred embodiment, the lift assembly includes an elongated drive housing which is rigidly mounted to the base of a pop-up camper in a generally horizontal position. A pair of aligned left and right threaded screw drives are mounted in the drive housing for rotatable movement therein and each screw drive has a proximate end and a distal end. A motor, preferably a 12 volt DC motor, is also provided which is attached to the proximate end of each left and right screw drive for rotatably driving each screw drive in a camper top raising direction upon actuation of said motor in a first direction and for rotatably driving each screw drive in a camper top lowering direction upon actuation of the motor in an opposite second direction. In addition, a right bushing is threadably received on the right screw drive for movement along the right screw drive in a direction toward the distal end of the right screw drive upon actuation of the motor in the first direction and upon actuation of the motor in an opposite second direction the right bushing moves away from the distal end of the right screw drive. A left bushing is also provided and threadably received on the left screw drive for movement along the left screw drive. The left bushing moves toward the distal end of the left screw drive upon actuation of the motor in the first direction and away from the distal end of the left screw drive upon actuation of said motor in the second direction. In addition, a pair of cooperating left and right main lift arms are provided, each of which has a proximate end and a distal end. The proximate end of the left main lift arm is pivotally attached to the left bushing with the distal end thereof pivotally attached to the roof structure of the pop-up camper. The proximate end of the right main lift arm is pivotally attached to the right bushing with the distal end thereof also being pivotally attached to the roof structure. The right and left main lift arms cooperate by moving in unison to raise the roof structure upon actuation of the motor in the first direction and lower the roof structure upon actuation of the motor in the opposite second direction.

In addition, the present invention provides a powered raisable roof system for a pop-up camper. The powered raisable roof system includes a raisable roof structure for a pop-up camper having a rigid center roof area and a flexible wall attached to the periphery of the rigid center roof area. The flexible wall is attachable to the main body of the pop-up camper to enable the formation of a spacious, enclosed area when the roof structure is raised. An air conditioner is mounted in the raisable roof structure and an electric powered drive system for raising and lowering the roof structure is also provided.

BRIEF DESCRIPTION OF THE DRAWINGS

FIG. 1 additionally illustrates in dotted lines an air conditioning unit mounted in the roof structure of the camper.

DETAILED DESCRIPTION OF THE INVENTION

Figure 1:
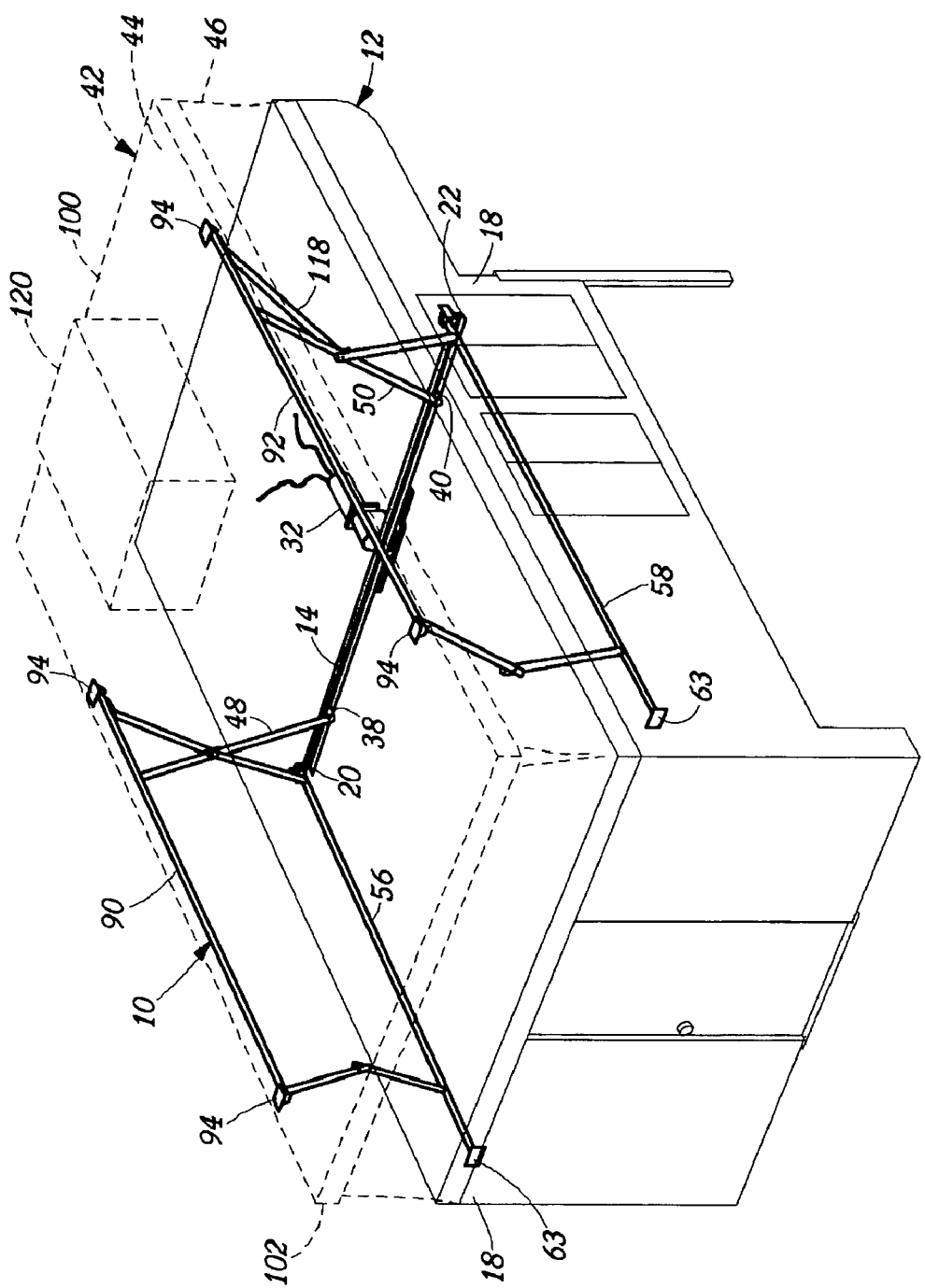
FIG. 1 is a perspective view of an embodiment of the present invention which in solid dark lines illustrates the preferred lift system of the present invention installed in a pop-up camper.

The preferred embodiment of the present invention will now be described hereinafter with reference made to FIGS. 1–5. As shown in dark solid lines in FIG. 1, power lift assembly 10 is mounted inside a slide in pop-up camper unit 12 which is designed for mounting in the bed of a pick-up truck (not shown). It is to be understood that while power lift assembly 10 is shown as being mounted in a conventional pop-up camper unit 12, it can be utilized in a variety of other environments.

As shown, lift assembly 10 includes an elongated drive housing 14 which is rigidly and securely mounted to the base of a pop-up camper such as the sleeping area floor 16 and wall 18 of the camper. As also shown, drive housing is mounted in a generally horizontal position and has oppositely facing left and right ends 20, 22.

Figure 4:
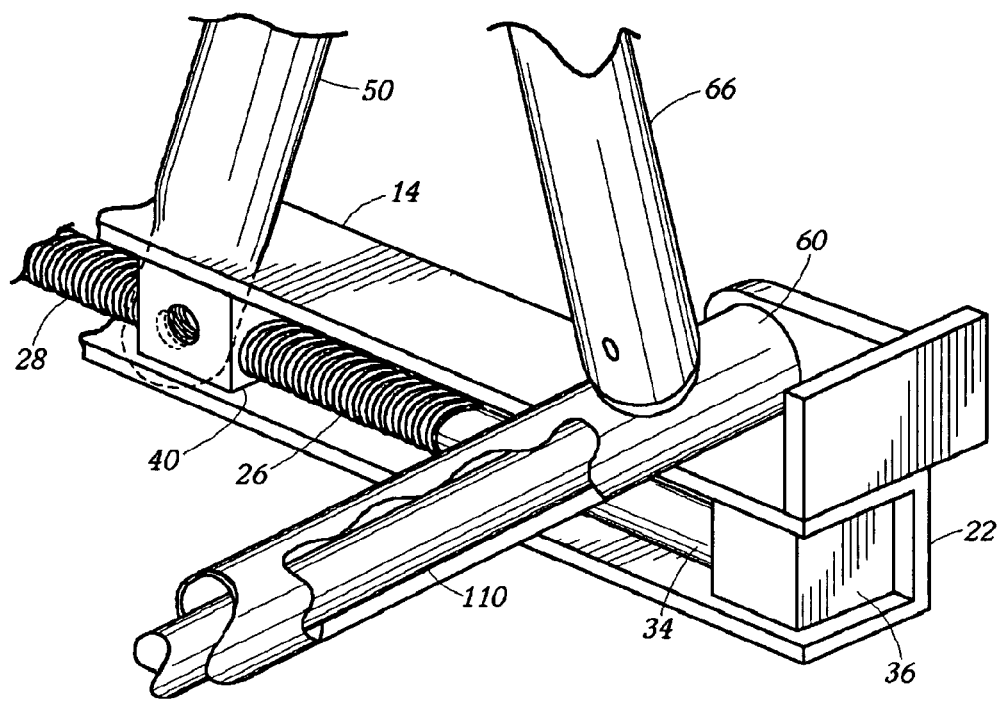
FIG. 4 is an enlarged perspective view showing detail of a portion of the lift system illustrated in FIG. 1 as well as a broken away portion showing the system's use of torsion rods to enhance the system's lift capacity.
Figure 5:
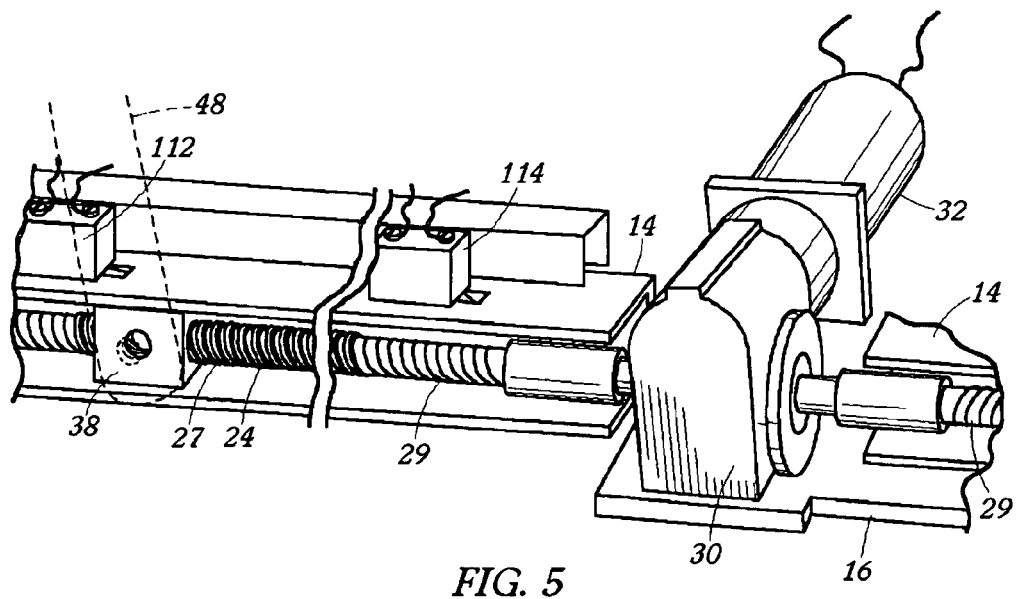
FIG. 5 is another enlarged perspective view showing detail of the motor and threaded screw drive of the lift system of FIG. 1.

As best shown in FIGS. 4 and 5, a pair of aligned left and right threaded screw drives 24, 26 respectively having left and right turning (ACME type) threads 27, 28 are mounted in drive housing 14 for rotatable movement therein. Each screw drive has a threadless proximate end 29 which is attached to the drive assembly 30 of a motor 32. The drive assembly and motor shown in the drawings are of the 12 volt DC type and draw low amperage so as to not run down the power source of the camper unit which is typically comprised of batteries, preferably six volt, deep cycle batteries. A preferred motor for use in the illustrated embodiment of the present invention is a non-backdriveable, 12 volt DC motor identified by RAE part No. 3130293 and is manufactured by the RAE Corporation of McHenry, Ill.

Turning now to the other ends, i.e. the distal ends 34, of screw drives 24, 26, it is shown in FIG. 4 that the distal ends 34 of the screw drives are also threadless and are supported and received for rotation therein in a bore (not shown) of a block member 36 which is attached to drive housing 14.

The Figures also illustrate that left and right bushings 38, 40 are threadably received on the left and right screw drives, respectively. The bushings are held in drive housing 14 so that they do not rotate with or on their respective screw drives when the screw drives are rotated by actuation of motor 32. Instead, drive housing 14 serves as a track for the bushings so that the bushings move axially along the screw drives when the motor is actuated. In addition, since screw drives 24, 26 have threads 27, 28 which as indicated above turn in opposite directions when the motor is actuated, left and right bushings 38, 40 travel in opposite directions when motor 32 is actuated. Accordingly, it will be appreciated that when motor 32 is actuated in a first direction the left and right bushings 38, 40 will move away from each other but towards the distal end of the screw drive upon which it is threadably received. Similarly, when motor 32 is actuated in the opposite or reverse direction, the left and right bushings 38, 40 will move towards each other and toward the proximate end of the screw drive upon which it is threadably received. Bushings 38, 40 are also preferably made from a bronze alloy sold under the mark Olite™ which is a self-oiling alloy that eliminates any need to oil the bushings.

Figure 2:
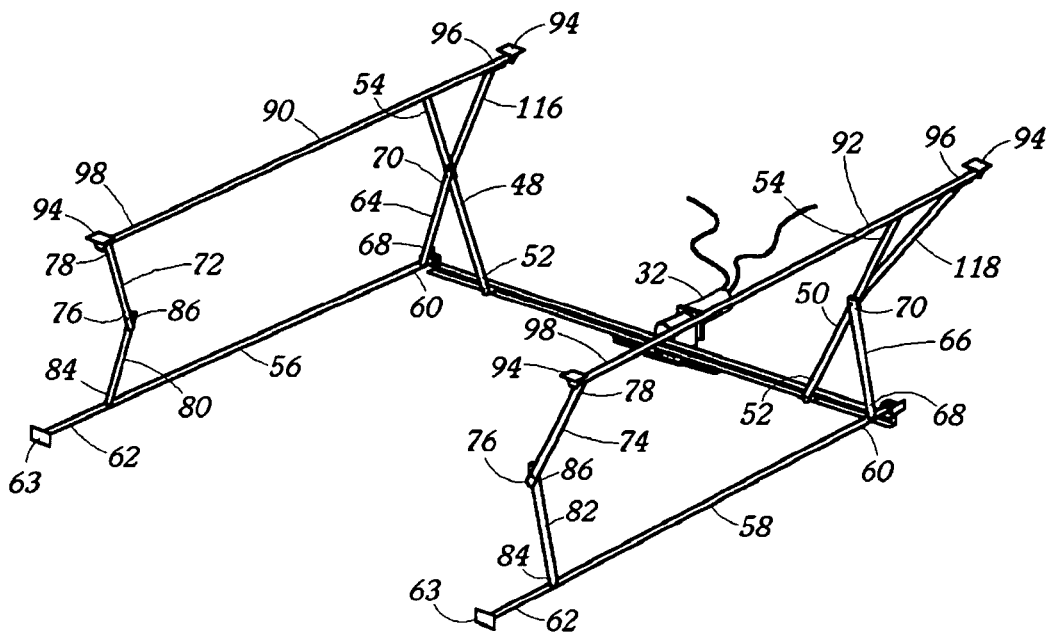
FIG. 2 is a perspective view showing the lift system of FIG. 1 in its raised or extended position.
Figure 3:
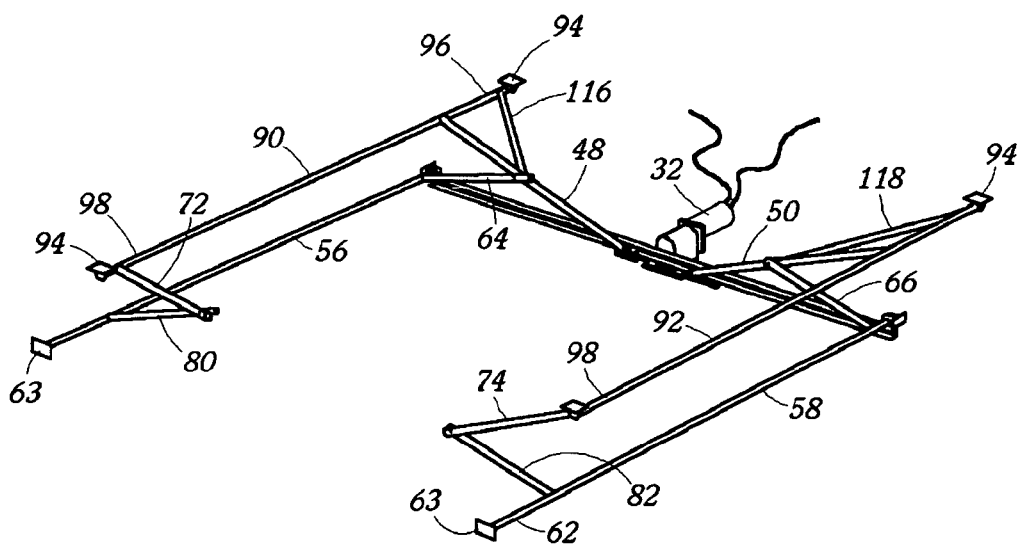
FIG. 3 is a perspective view showing the lift system of FIG. 1 in its lowered or collapsed position.

To raise (and lower) the roof structure 42 of the camper which has a conventional rigid center roof area 44 and a flexible or soft insulated wall 46 attached to the periphery of the rigid center roof area and the sides 18 of the main body of the camper, power lift assembly 10 of the present invention is provided with a collapsible lifting apparatus (not numbered) which is best shown in FIGS. 2 and 3 and which is moveable between a generally horizontal lowered or collapsed position shown in FIG. 3 and a generally horizontal raised or extended position shown in FIG. 2.

To move the lifting apparatus between these positions, the lifting apparatus generally includes a pair of spaced, parallel, upper left and right upper lift assisting tubes 90, 92 which are rotatably attached to the rigid center roof area 44 of the roof structure and a pair of spaced, parallel, lower left and right lift assisting tubes 56, 58 which are rotatably attached to the main body of the camper as well as a plurality of pivoting lift arms (identified and numbered below) which are pivoted by actuation of motor 32 to raise and lower the lifting apparatus between the raised and collapsed positions.

As best shown in FIGS. 2 and 3, the pivoting lift arms of the lifting apparatus include a pair of cooperating left and right main lift arms 48, 50, each of which has a proximate end 52 and a distal end 54. As shown, the proximate end 52 of the left main lift arm 48 is pivotally attached to left bushing 38 while its distal end 54 is pivotally attached to the rigid center area 44 of the roof structure by the upper left rotatable lift assisting tube 90 which is mounted for rotatable movement to rigid center area 44 by a pair of rotatable mounting means or feet 94 which are attached to the proximate and distal ends 96 and 98 of upper left tube 90. Similarly, the proximate end 52 of the right main lift arm 50 is pivotally attached to the right bushing 40 while its distal end 54 is pivotally attached to area 44 of the roof structure by the upper right rotatable lift assisting tube 92 which is mounted for rotatable movement to rigid center area 44 by another pair of rotatable mounting means or feet 94 which are attached to the proximate and distal ends 96 and 98 of upper left tube 92. Accordingly, it will be appreciated that when the motor is actuated in a first direction bushings 38, 40 will move away from each other along their respective screw drives as described above and the left and right main lift arms 48, 50 attached to bushings 38, 40 will move in unison from their collapsed, more horizontal positions illustrated in FIG. 3 to their more vertical or upright positions illustrated in FIG. 2, thereby raising the roof structure 42 to its raised position illustrated in FIG. 1. As will be appreciated to lower the roof structure the motor is simply actuated in the opposite or reverse direction.

To assist in the lifting operation, the lifting apparatus is also provided with the aforementioned pair of spaced, parallel elongated left and right rotatable lift assisting tubes 56, 58, each of which has a proximate end 60 and a distal end 62. As shown, tubes 56, 58 are horizontally disposed along opposite sides of the camper with their proximate ends 60 mounted for rotatable movement at the respective ends of the drive housing 14 and their distal ends 62 mounted at 63 for rotatable movement to the wall 18 of the pop-up camper or to another surface of the base of the camper. Left and right first support arms 64, 66, each of which has a proximate end 68 and a distal end 70, are also provided with the proximate ends of each first support arm being rigidly affixed at right angles to the proximate ends of tubes 56, 58 and with the distal ends of the first support arms being pivotally attached to the main lift arms at a point near the center of the main lift arms. Left and right second auxiliary lift arms 72, 74 are also provided, each of which has a proximate end 76 and a distal end 78 with the distal ends thereof rigidly attached to the distal ends 98 of the upper left and right lift tubes 90, 92. In addition, left and right second support arms 80, 82 are provided, each of which has a proximate end 84 and a distal end 86. As shown, the proximate ends 84 of the second support arm are rigidly affixed at right angles to the distal ends of lower tubes 56, 58 and the distal ends 86 of the first support arms are pivotally attached to the proximate ends 76 of the auxiliary lift arms. Accordingly, it will be appreciated that the left and right first support arms 64, 66 cause the left and right lower lift assisting tubes 56, 58 to rotate in unison when the left and right main lift arms 48, 50 are moved in unison by the actuation of the motor. This rotation of the lower tubes 56, 58 causes the left and right second support arms 80, 82 to pivot the left and right second auxiliary lift arms 72, 74 from their somewhat horizontal position shown in FIG. 3 to their more vertical position shown in FIG. 2, thereby assisting the main lift arms 48, 50 in raising the roof structure of the camper. It will also be appreciated that while the lower tubes 56, 58 are rotating, the upper left and right lift assisting tubes 90, 92 will also be rotating in unison due to the actuation of motor 32. This rotation of the upper lift tubes also assists in raising the roof structure since it causes the left and right second auxiliary lift arms 72, 74 to move, actually lift, the distal ends 86 of the left and right second support arms 80, 82.

In addition to the illustrated lifting apparatus and to enhance the lifting capability of the aforementioned system, lift assembly 10 of the present invention is also provided with torsion rods 110 which as illustrated in FIG. 4 are mounted in the lower lift assisting tubes 56, 58 and which assist the motor in initiating the action of raising the roof structure upon actuation of the motor. As known to those skilled in the art, torsion rods store energy when coiled or twisted in a certain direction which in the illustrated embodiment occurs when the lift assembly is lowered to its collapsed position illustrated in FIG. 3. This stored energy is released when the motor is actuated which allows the torsion rods to untwist or uncoil, thereby assisting the motor initiate the action of raising the roof structure.

The illustrated embodiment of the present invention also includes an automatic shut off feature for the motor 32 which includes calibratable electronic switches for sensing when the bushings on the left and right screw drives reach predetermined locations on the screw drives and then shut off power to the motor when the bushing reaches the predetermined location. As illustrated in FIG. 5, two electronic switches are provided in the illustrated embodiment, one referred to as the upper limit switch 112 for shutting motor 32 off when the roof structure is raised to the position shown in FIG. 2 in which the flexible wall is extended to form the desired spacious, enclosed area shown in FIG. 1. The other switch is referred to as the lower limit switch 114 which shuts motor 32 off when the roof structure is lowered to the position shown in FIG. 3 in which in which the flexible wall is collapsed. A preferred electronic switch for use in the illustrated embodiment is a microswitch identified by part no. A-20GV22-B7K and manufactured by Omron Electronics LLC of Schaumburg, Ill.

In addition, if either or both electronic switches 112, 114 were to fail, bushings 38, 40 would travel into one of the aforementioned threadless proximate and distal sections 29, 34 of the screw drives and stop moving along the screw drive because these sections of the screw drives are threadless. Accordingly, movement of the roof structure is stopped before damage to the flexible wall of the roof structure can occur which could occur, for example, if the roof structure were to be raised or extended too far, i.e. beyond the preferred raised position illustrated in FIG. 1.

The lifting apparatus of the illustrated embodiment also includes a pair of stiffening arm 116, 118 which are rigidly connected to the center of the main lift arms 48, 50 and the proximate ends 96 of upper lift tubes 90, 92. Stiffening arms 116, 118 help to prevent upper tubes 90, 92 from bowing upwardly due to the weight of roof structure 42.

As indicated above, motor 32 is non-backdriveable which as used herein means that the shaft of the motor will not rotate backwards after it is shut off. This non-backdriveable feature is a safety feature since it prevents the roof structure from collapsing to the position shown in FIG. 3 after it has been raised to its extended position shown in FIGS. 1 and 2. While non-backdriveable, motor 32 also preferably includes a manual overdrive feature which allows the motor to be manually driven to raise and lower the roof structure which might be necessary if, for example, the batteries for supplying power to the lift were to lose their charge. The manual overdrive is easily provided by simply installing a hex headed bolt on the end of the motor shaft, the hex head of which can be manually turned with a wrench or even a power type screwdriver if necessary in the event of a power failure or as indicated weak or dead battery.

A major advantage of the illustrated power lift assembly of the present invention is that it not only enables easy raising and lowering of the camper's roof structure, it also enables mounting of a load on the roof structure of up to about 400 pounds over and above the weight of the roof structure itself which is typically about 275 pounds. As such, power lift assembly 10 has the capability of raising a load including the roof structure of almost 700 pounds. With this lift capacity, it will be appreciated that a roof mounted air conditioner 120 as shown in FIG. 1 which typically weigh about 125 pounds can be permanently mounted in the roof structure. This lift capacity also enables other items such as a canoe or kayak to be mounted on the roof structure in addition to the illustrated air conditioning unit 120.

While this invention has been described as having a preferred design, it is understood that it is capable of further modifications, uses and/or adaptions following in general the principle of the invention and including such departures from the present disclosure as come within the known or customary practice in the art to which the invention pertains and as maybe applied to the central features hereinbefore set forth, and fall within the scope of the invention and the limits of the appended claims.

We claim:

1. A cableless power lift assembly for raising and lowering the roof structure of a pop-up camper, comprising:

an elongated drive housing rigidly mounted to the base of a pop-up camper in a generally horizontal position and having oppositely facing left and right ends, a pair of aligned left and right threaded screw drives mounted in said drive housing for rotatable movement within said drive housing, each said screw drive having a proximate end and a distal end, a motor attached to the proximate end of each said left and right screw drive for rotatably driving each said screw drive in a camper top raising direction upon actuation of said motor in a first direction and for rotatably driving each said screw drive in a camper top lowering direction upon actuation of said motor in an opposite second direction, a right bushing threadably received on said right screw drive for movement along said right screw drive, said bushing moving toward said distal end of said right screw drive upon actuation of said motor in the first direction and away from said distal end of said right screw drive upon actuation of said motor in the second direction, a left bushing threadably received on said left screw drive for movement along said left screw drive, said bushing moving toward said distal end of said left screw drive upon actuation of said motor in the first direction and away from said distal end of said left screw drive upon actuation of said motor in the second direction, a pair of cooperating left and right main lift arms, each of which has a proximate end and a distal end, said proximate end of said left main lift arm being pivotally attached to said left bushing with said distal end of said left main lift arm being pivotally attached to the roof structure of the pop-up camper, said proximate end of said right main lift arm being pivotally attached to said right bushing with said distal end of said right main lift arm also being pivotally attached to the roof structure, said right and left main lift arms cooperating to move in unison to raise the roof structure upon actuation of said motor in the first direction and lower the roof structure upon actuation of said motor in the opposite second direction;

a pair of elongated, spaced, parallel and generally horizontally disposed upper left and right rotatable lift assisting tubes mounted for rotatable movement to the roof structure of the pop-up camper, each of said left and right upper tubes having a proximate end and a distal end which include rotatable mounting means for rotatably mounting said left and right upper tubes to the roof structure, a pair of elongated, spaced, parallel and generally horizontally disposed lower left and right rotatable lift assisting tubes, each of which has a proximate end and a distal end, said proximate end of said lower left tube being mounted for rotatable movement at the left end of said drive housing with said proximate end of said lower right tube being mounted for rotatable movement at the right end of said drive housing, said distal ends of said lower left and right tubes also being mounted for rotatable movement on the base of the pop-up camper, left and right first support arms, each of which has a proximate end and a distal end, said proximate end of said left first support arm being rigidly affixed at an angle to said proximate end of said lower left lift tube with said distal end of said left first support arm being pivotally attached to said left main lift arm, said proximate end of said right first support arm being rigidly affixed at an angle to said proximate end of said lower right lift tube with said distal end of said right first support arm being pivotally attached to said right main lift arm, left and right second auxiliary lift arms, each of which has a proximate end and a distal end with said distal end of said left second auxiliary arm being rigidly affixed at an angle to said distal end of said let upper lift tube and said distal end of said right second auxiliary arm being rigidly affixed at an angle to said distal end of said right upper lift tube, and left and right second support arms, each of which has a proximate end and a distal end, said proximate end of said left second support arm being rigidly affixed at an angle to said distal end of said lower left lift tube with said distal end of said left first support arm being pivotally attached to said proximate end of said left auxillary lift arm, said proximate end of said right first support arm being rigidly affixed at an angle to said proximate end of said lower right lift tube with said distal end or said right first support arm being pivotally attached to said proximate end of said right auxiliary lift arm, said left and right first support arms causing said lower left and right lift assisting tubes to rotate in unison when said left and right main lift arms are moved in unison by the actuation of said motor, said rotating lower left and right lift assisting tubes in turn causing said left and right second support arms to move said proximate ends of said left and right second auxiliary lift arms to assist said main lift arms in raising and lowering the roof structure of the pop-up camper, said upper left and right lift assisting tubes also rotating in unison when said left and right main lift arms are moved in unison by the actuation of said motor, said rotating upper left and right lift assisting tubes in turn causing said left and right second auxiliary lift arms to move said distal ends of said left and right second support arms to assist said main lift arms in raising and lowering the roof structure of the pop-up camper when said motor is actuated.

2. A power lift assembly for raising and lowering the roof structure of a pop-up camper, comprising:

a pair of aligned left and right threaded rotatable screw drives, a motor attached to said left and right screw drives for rotatably driving screw drives, collapsible lifting apparatus driven by said left and right screw drives for raising the roof structure of a pop-up camper from a generally horizontal lowered, collapsed position to a generally horizontal raised, extended position upon actuation of said motor in a first direction and lowering the roof structure from the raised position to the lowered position upon actuation of the motor in an opposite second direction, and a pair of left and right torsion rods connected to said lifting apparatus for assisting the motor in initiating the action of raising the roof structure upon actuation of the motor.

3. A power lift assembly as claimed in claim 2 wherein said motor is non-back driveable.

4. A power lift assembly as claimed in claim 2 wherein said motor includes override means for operating said motor manually.

5. A power lift assembly as claimed in claim 1 wherein said bushings are self-oiling.

6. A power lift assembly as claimed in claim 2 wherein each said left and right screw drive includes non-threaded sections at its proximate and distal ends for preventing further movement of said bushings at said proximate and distal ends.

7. A power lift assembly as claimed in claim 1 further including calibratable electronic switches for limiting movement of said bushings along said left and right screw drives.

8. A power lift assembly as claimed in claim 2 having the capability of raising and lowering a roof structure having a weight of at least 350 pounds.

9. A power lift assembly as claimed in claim 2 having the capability of raising and lowering a roof structure having a weight of at least 400 pounds.

10. A power lift assembly as claimed in claim 2 having the capability of raising and lowering a roof structure having a weight of between about 250 and 700 pounds.

11. A power lift assembly as claimed in claim 1 further wherein the left and right rotatable lift assisting tubes further include torsion rods for assisting the motor in initiating the action of raising the roof structure upon actuation of the motor.

12. A powered raisable roof system for a pop-up camper, comprising:
   a raisable roof structure for a pop-up camper having a rigid center roof area and a flexible wall attached to the periphery or the rigid center roof area, said flexible wall further being attachable to the main body of the pop-up camper to enable the formation of a more spacious, enclosed area when the roof structure is raised,
   an air conditioner mounted in the raisable roof structure,
   an elongated drive housing rigidly mounted to the base of a pop-up camper in a generally horizontal position and having oppositely facing left and right ends,
   a pair of aligned left and right threaded screw drives mounted in said drive housing for rotatable movement within said drive housing, each said screw drive having a proximate end and a distal end,
   a motor attached to the proximate end of each said left and right screw drive for rotatably driving each said screw drive in a camper top rasing direction upon actuation of said motor in a first direction and for rotatably driving each said screw drive in a camper top lowering direction upon actuation of said motor in an opposite second direction,
   a right bushing threadably received on said right screw drive for movement along said right screw drive, said bushing moving toward said distal end of said right screw drive upon actuation of said motor in the first direction and away from said distal end of said right screw drive upon actuation of said motor in the second direction,
   a left bushing threadably received on said left screw drive for movement along said left screw drive, said bushing moving toward said distal end of said left screw drive upon actuation of said motor in the first direction and away from said distal end of said left screw drive upon actuation of said motor in the second direction,
   a pair of cooperating left and right main lift arms, each of which has a proximate end and a distal end, said proximate end of said left main lift arm being pivotally attached to said left bushing with said distal end of said left main lift arm being pivotally attached to the collapsible roof structure of the pop-up camper, said proximate end of said right main lift arm being pivotally attached to said right bushing with said distal end of said right main lift arm also being pivotally attached to the collapsible roof structure, said right and left main lift arms cooperating to move in unison to raise the roof structure upon actuation of said motor in the first direction and lower the roof structure upon actuation of said motor in the opposite second direction, and
   a pair of left and right torsion rods cooperating with said left and right main lift arms for assisting the motor in initiating the action of raising the roof structure upon actuation of the motor.

13. A powered raisable roof system as claimed in claim 12 further comprising:
   a pair of elongated, spaced, parallel and generally horizontally disposed upper left and right rotatable lift assisting tubes mounted for rotatable movement to the roof structure of the pop-up camper, each of said left and right upper tubes having a proximate end and a distal end which include rotatable mounting means for rotatably mounting said left and right upper tubes to the roof structure,
   a pair of elongated, spaced, parallel and generally horizontally disposed lower left and right rotatable lift assisting tubes, each of which has a proximate end and a distal end, said proximate end of said lower left tube being mounted for rotatable movement at the left end of said drive housing with said proximate end of said lower right tube being mounted for rotatable movement at the right end of said drive housing, said distal ends of said lower left and right tubes also being mounted for rotatable movement on the base of the pop-up camper,
   left and right first support arms, each of which has a proximate end and a distal end, said proximate end of said left first support arm being rigidly affixed at an angle to said proximate end of said lower left lift tube with said distal end of said left first support arm being pivotally attached to said left main lift arm, said proximate end of said right first support arm being rigidly affixed at an angle to said proximate end of said lower right lift tube with said distal end of said right first support arm being pivotally attached to said right main lift arm,
   left and right second auxiliary lift arms, each of which has a proximate end and a distal end with said distal end of said left second auxiliary arm being rigidly affixed at an angle to said distal end of said left upper lift tube and said distill end of said right second auxiliary arm being rigidly affixed at an angle to said distal end of said right upper lift tube, and
   left and right second support arms, each of which has a proximate end and a distal end, said proximate end of said left second support arm being rigidly affixed at an angle to said distal end of said lower left lift tube with said distal end of said left first support arm being pivotally attached to said proximate end of said left auxiliary lift arm, said proximate end of said right first support arm being rigidly affixed at an angle to said proximate end of said lower right lift tube with said distal end of said right first support arm being pivotally attached to said proximate end of said right auxiliary lift arm,
   said left and right first support arms causing said lower left and right lift assisting tubes to rotate in unison when said left and right main lift arms are moved in unison by the actuation of said motor, said rotating lower left and right lift assisting tubes in turn causing said left and right second support arms to move said proximate ends of said left and right second auxiliary lift arms to assist said main lift arms in raising and lowering the roof structure of the pop-up camper, said upper left and right lift assisting tubes also rotating in unison when said left and right main lift arms are moved in unison by the actuation of said motor, said rotating upper left and right lift assisting tubes in turn causing said left and right second auxiliary lift arms to move said distal ends of said left and right second support arms to assist said main lift arms in raising and lowering the roof structure of the pop-up camper when said motor is actuated.

14. A powered raisable roof system for a pop-up camper, comprising:

a raisable roof structure for a pop-up camper having a generally horizontally disposed rigid center roof area and a flexible wall attached to the periphery of the rigid center roof area, said flexible wall further being attachable to the main body of the pop-up camper to enable the formation of a more spacious, enclosed area when the roof structure is raised, an air conditioner mounted in the raisable roof structure, an electric powered drive system for raising and lowering the roof structure between a generally horizontal lowered position in which said flexible wall is collapsed and a generally horizontal raised position in which the flexible wall is extended to form the more spacious, enclosed area, and torsion rods connected to said electric powered drive system for assisting said electric powered drive system in initiating the action of raising the roof structure upon actuation of said electric powered drive system.

15. A power lift assembly as claimed in claim 2 wherein said lifting apparatus includes:

a pair of elongated, spaced, parallel and generally horizontally disposed upper left and right rotatable lift assisting tubes mounted for rotatable movement to the roof structure of the pop-up camper, each of said left and right upper tubes having a proximate end and a distal end which include rotatable mounting means for rotatably mounting said left and right upper tubes to the roof structure, and a pair of elongated, spaced, parallel and generally horizontally disposed lower left and right rotatable lift assisting tubes, each of which has a proximate end and a distal end, said proximate end of said lower left tube being mounted for rotatable movement at the left end of said drive housing with said proximate end of said lower right tube being mounted for rotatable movement at the right end of said drive housing, said distal ends of said lower left and right tubes also being mounted for rotatable movement on the base of the pop-up camper, and wherein said left torsion rod is mounted in said lower left lift assisting tube and said right torsion rod is mounted in said lower right lift assisting tube.

* * * * *